Oct. 16, 1962     H. MATUSCHE     3,058,252

ELECTRIC FISHING EQUIPMENT

Filed July 30, 1959

United States Patent Office 3,058,252
Patented Oct. 16, 1962

3,058,252
ELECTRIC FISHING EQUIPMENT
Heinz Matusche, Hamburg, Germany, assignor to Jurgen Dethloff, Hamburg-Lokstedt, Germany
Filed July 30, 1959, Ser. No. 830,494
Claims priority, application Germany Aug. 14, 1958
7 Claims. (Cl. 43—17.1)

My invention relates to devices for constrainedly guiding or catching fish and other animal life in sea water by electrotaxis, namely by taking advantage of the phenomenon that fish are urged to approach the cathode when subjected to an electric field produced by passing unidirectional current through the sea water between submerged electrodes.

In a more particular aspect, my invention relates to electrotaxis equipment for use aboard industrial fishing vessels where space and power requirements are at a premium.

A continuous direct current, such as obtainable from a dynamoelectric power generator, is not applicable for sea fishing purposes because sea water is a good electrical conductor so that the current loading upon a continuous current supply would be greatly excessive and would require infeasibly large equipment. It is necessary, therefore, to operate with short lasting current pulses. It has become known to produce such pulses by charging storage capacitors from a generator and to intermittently discharge the capacitors through the water under control by a switch. However, at the moment or interval of pulse discharge, the current supply is virtually shorted by the sea water so that extremely high load shocks must be coped with, thus requiring a correspondingly large rating and entailing an extremely poor efficiency of the generator and associated equipment, unless special expedients are resorted to; but all past attempts at improvement have left much to be desired.

According to one of the known proposals, an alternator charges a storage capacitor during a portion of only one half-wave of the alternating voltage, no current being drawn from the alternator during the other half-wave while the capacitor is being discharged through the water. This imposes an asymmetrical load upon the alternator and utilizes less than one-half of its generating capacity. The use of voltage-doubling or voltage-multiplying circuits for increasing the rectified voltage obtained from the alternator in such a system does not do away with the asymmetrical, unsatisfactory loading of the alternator.

According to another known proposal, the hard shocks of generator loading are moderated by adding a bank of buffer capacitors between the generator and the pulse-discharge capacitor proper. During the discharge interval, the buffer capacitors are disconnected by a switch from the parallel connected discharge capacitor.

It has also become known to connect the pulse discharge capacitor after each discharge in series with the buffer capacitors under control by four switching units which jointly operate as a periodic reversing switch so as to exchange the terminals of the discharge capacitor after each discharge. While in all such buffer capacitor systems the discharge of the pulse capacitor can reduce the buffer-capacitor voltage down to the share of the rectified voltage that corresponds to the capacitance ratio of buffer capacitors to impulse capacitor, thus softening the load shocks imposed upon the generator, such buffer systems require a bank of buffer capacitors many times larger than the pulse discharge capacitor and hence are too expensive and too large for economical use, particularly aboard ship. Furthermore, the alternator load remains asymmetrical and its efficiency is low, especially if the frequency of the discharges corresponds to the alternator frequency and a single-phase alternator is used.

It is an object of my invention to eliminate the above-mentioned deficiencies of the known electrotaxis devices and to provide a system which, by means of relatively few and simple components, achieves a satisfactorily uniform loading of the current source during both half-wave periods of its alternating voltage while protecting the source from being subjected to load shocks due to closing of the sea-water electrode circuit.

According to a feature of my invention, I charge a group of pulse capacitors from a source of single-phase alternating current through a full-cycle rectifier, and connect the load circuit, i.e. the circuit of the two electrodes submerged in sea water when in operation, to the storage capacitors through a periodically operating switch, preferably of an electronic type. I further connect the control means of the switch with the just-mentioned source of alternating power current so that the switch is periodically controlled to momentarily close in response to a given zero-passage condition of the source voltage. As a result, the source is substantially uniformly loaded by the rectifier during both half-wave periods of each voltage cycle, and the capacitor discharge pulses, each having an extremely short duration relative to the voltage cycle, are released at recurrent moments at or near respective zero passages of the source voltage so that no shock load is imposed upon the source.

The term "full-cycle rectifier" used above and hereinafter, is understood to generally mean any rectifier circuit or network in which two or more rectifier elements, preferably solid-state diodes, connect the storage capacitor or capacitors to the power source during the positive as well as the negative half-waves of the source voltage. Any full-wave rectifier, such as a bridge network of rectifiers, also called Graetz connection, may be used for this purpose so that one and the same capacitor or capacitor group is charged during each positive and negative half-wave of the alternating source voltage, and the pulse control switch in the electrode circuit may be operated at or near any one of the zero passages of that voltage.

However, according to another, preferred feature of my invention, the full-cycle rectifier for charging the pulse capacitors in the electrotaxis apparatus forms a voltage-doubler network together with a group of series-connected storage capacitors that are charged from the source through respectively different rectifier elements during the respective positive and negative half-waves, so that a charging cycle extends over one positive and one negative half-wave, and the pulse control switch in the electrode circuit responds to respective zero passages in intervals of full-wave periods. Such a voltage-doubler network (also called Greinacher-Delon connection) facilitates using a conventional alternator of customary voltage and frequency, such as 220 volts at 50 or 60 c.p.s., as a power source, preferably in connection with a transformer for adjusting the charging voltage of the capacitor as may be desirable for setting the pulse voltage in accordance with the kind and average length of the fish to be caught.

The invention will be further explained with reference to the embodiments of electrofishing apparatus illustrated by way of example on the accompanying drawings, in which.

Figure 1:
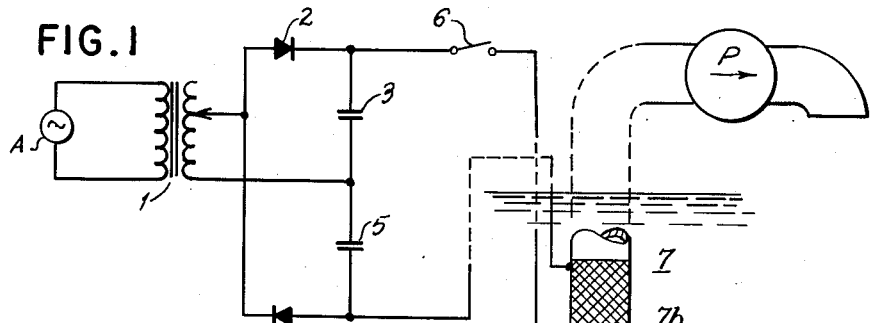
FIG. 1 is a simplified electric circuit diagram shown in conjunction with a schematic illustration of accessory electrode and pumping equipment.

The apparatus according to FIG. 1 is designed for use aboard a commercial fishing vessel. It comprises an alternating current source consisting of a single-phase alternator A of conventional voltage and frequency, for example 220 volts 50 or 60 c.p.s. The alternator is connected through a transformer 1 and through two diode rectifiers 2, 4, preferably of the static type, with two capacitors 3 and 5. The rectifiers and capacitors are connected with the secondary winding of transformer 1 in a voltage doubler circuit. The two capacitors 3, 5, each of which may be formed by a group of parallel connected individual capacitors, form the source of discharge current for an electrode circuit which comprises a switch 6 for controlling the discharge pulses. The electrode circuit, in the embodiment of FIG. 1, is shown to be connected to an anode 7a and a cathode 7b. The anode 7a consists of a spherical basket assembly of good conducting wires attached to the inlet portion of a pumping hose 7c. The cathode 7b is shown to consist of a sleeve of wire mesh mounted on the hose 7c. The hose is connected with a pump P which serves to pump the water into the fishing vessel together with the attracted fish. During operation, the two electrodes 7a and 7b are submerged in sea water. It will be understood that the particular design and mounting of the electrodes is not essential to the invention proper, nor is it essential that they be mounted on, or connected with a pumping hose. As a rule, the location of the anode is chosen in accordance with the particular spot to which the fish to be caught are to be guided by electrotaxis, whereas the cathode 7b may be mounted on the hull of the vessel or may be constituted by the hull or parts thereof.

The load connected to the storage capacitors is thus constituted by the electrode circuit comprising the two mutually spaced electrodes 7a, 7b and the sea water located between them, this load being denoted as a whole by the reference character 7 and being only schematically represented by item 7 in the other illustrations.

During operation of the apparatus, the alternator continuously charges the capacitors 3 and 5 through the rectifiers 2 and 4. That is, during the positive half-wave of the charging voltage, only the capacitor 3 is charged through rectifier 2, and during the negative half-wave the capacitor 5 is charged through rectifier 4. After each completed charging cycle extending over at least one full cycle period of alternator voltage, the total capacitor voltage at the terminals of the group of series connected capacitors is twice the adjusted secondary voltage of the transformer 1.

The switch 6, preferably consisting of an electronic switching device as more fully explained below, is so controlled that it closes the electrode circuit for a momentary interval of time when the alternator voltage, after completing a full cycle, passes through the zero value. This causes the capacitors 3, 5 to discharge a pulse through the electrode circuit and the sea water. The discharge pulse is extremely short in comparison with the cycle period of the alternator voltage. For example, the pulse may be terminated in less than one millisecond, this being due to the fact that the ohmic resistance in the electrode circuit is extremely small. Hence, the pulse is essentially in the nature of a short-circuit discharge which is strongly damped by the high ohmic resistance and slight reactance of the electrode loop circuit. As a rule, the pulse comprises a positive half-wave which is aperiodically damped to such an extent that it is followed substantially only by a very much smaller negative half-wave, any other ripples of the decaying pulse being completely negligible with respect to the electrotaxis effect.

As soon as the momentary discharge pulse has passed through the switch 6, the switch opens, i.e. becomes non-conductive. At the closing moment, the electrode circuit is subjected to a unidirectional voltage having twice the value of the alternator peak voltage. At this moment, the alternator voltage is zero or sufficiently close to the zero value so that no load shock is imposed upon the alternator. Since the time constant of the electrode pulse circuit, as explained, is very small in comparison with the duration of the alternator voltage cycle, the capacitors 3 and 5 are discharged before the alternator voltage can again rise to an appreciable amplitude.

Figure 2:
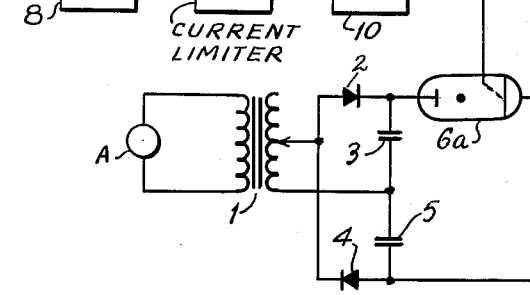
FIG. 2 is an explanatory circuit diagram relating to the use of an electronic switch-in apparatus according to FIG. 1.

As mentioned, the pulse control switch 6 is preferably of the electronic type. Particularly suitable are electronic switches, such as ignitrons, as used for control purposes in power-current operations. The ignitron is fired by an ignition device and then will momentarily conduct current and thereafter become automatically extinguished as soon as the capacitor voltage drops below the critical cutoff potential. Such an electronically controlled apparatus is diagrammatically shown in FIG. 2. As indicated, an ignitron is used as switch 6. In FIG. 2, the electronic firing components comprise, for example, an adjustable phase shifter 8 connected to the alternator or other alternating current source, a current limiter 9 for producing a trapezoidal wave-form with a differentiator and means for suppressing the negative impulse peaks, and an ignition voltage source 10, for example of the conventional thyratron type.

Figure 3:
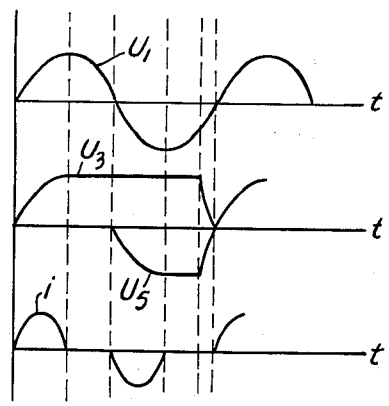
FIG. 3 is an explanatory graph indicating typical voltage and current curves as occurring in apparatus according to the invention.

The operation of the electronic apparatus is as described above with reference to FIG. 1. Typical time curves of the occurring voltages and currents are represented in the graph shown in FIG. 3, in which the ordinate represents time ($t$). The sine wave of the transformer or alternator voltage is represented by the curve $U_1$. The time curve of the voltage at capacitor 3 is shown at $U_3$ and the voltage of capacitor 5 at $U_5$. Denoted by $i$ is the current drawn from the alternator. This current flows through the respective capacitors 3 and 5 during the intervals of increasing capacitor voltage and is equally distributed upon both half portions of the cycle.

Figure 4:
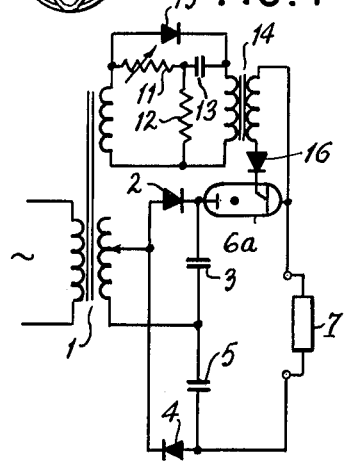
FIG. 4 is a complete schematic circuit diagram relating to electronic apparatus of the type corresponding to FIGS. 1 and 2.

The complete circuit diagram shown in FIG. 4 is designed, according to another feature of my invention, so as to avoid the use of any electronic tubes in the ignition control circuit of the ignition 6a. The capacitive pulse circuit of the electrodes and its operation are as described above with reference to FIGS. 1 to 3. The firing circuit of the ignitron 6a comprises a phase shifter which is inductively coupled with the transformer 1 and is composed of two ohmic resistors 11, 12 and a capacitor 13. The firing pulses are taken from an ignition transformer 14 which becomes magnetically saturated through a rectifier diode 15. The firing pulse, induced in the secondary winding of transformer 14, is applied to the ignitron 6 through a diode 16 which keeps the negative portion of the firing pulses away from the ignition electrode of the ignitron 6a. Consequently, the electronic switch according to this embodiment is momentarily closed only at or near those recurrent moments at which the alternator voltage passes from values of one given polarity through the zero value, thus causing a capacitor discharge in intervals equal to a full cycle period of the alternator voltage.

Figure 5:
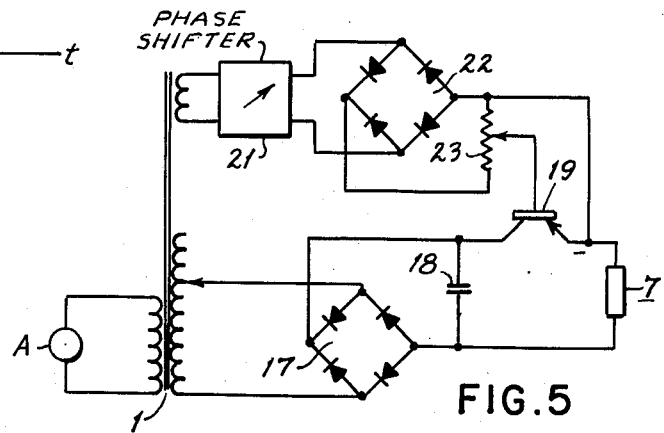
FIG. 5 illustrates a circuit diagram of another embodiment.

In the embodiments schematically illustrated in FIG. 5, the alternator A is connected through the transformer 1 with a full-wave rectifier bridge network 17 which charges a capacitor 18. The discharge from the capacitor into the electrode circuit is shown controlled by a power transistor 19, it being understood that for providing and controlling the necessary amounts of current, a group of parallel-connected capacitors on the one hand and a group of parallel transistors on the other hand may be used. The base-emitter circuit of transistor 19 receives an ignition pulse from transformer 1 through a phase shifter 21, a full-wave rectifier 22, and a potentiometer 23. In this case, the firing control operates to turn the transistor 19 on at a moment near each individual zero passage of the alternator voltage.

The following numerical examples are further illustrative of the invention and of the advantages achieved thereby.

An example of a desired time constant of the discharge pulse is $t=0.5.10^{-3}$ second. The impedance of the electrode circuit in a system according to FIGS. 1, 2 or 4 in practice, may possess, aside from the capacitance of the pulse capacitors, a purely ohmic resistance of 0.1 ohm, substantially formed by the transition resistance between the two electrodes in sea water. Under these practical conditions exemplified, the total capacitance of the capacitor group must be $C=5000$ μf., so that each of the capacitors or capacitor groups 3 and 5 may be given a capacitance of 10,000 μf. As explained, an apparatus according to the invention does not require any buffer capacitors which in known systems require a great multiple in capacitance in addition to the pulse capacitors proper.

The proper output (W) of the pulses is given by the formula $W=0.5CE^2f$, where E is the direct voltage of the pulse capacitors, C is the above-mentioned total capacitance of the capacitors, and $f$ is the frequency pulse recurrence, such as 50 or 60 c.p.s. The voltage E can be adjusted in accordance with the kind and length of the fish to be caught. Using an alternator of 220 volts output voltage and a frequency of 50 c.p.s., a total power output W of 3 kilowatts is required for a capacitor total voltage of $E=155$ volts, requiring each of the two capacitors 3 and 5 to be subjected to a charging voltage of 77.5 volts. For a voltage of 490 volts, a power output of 30 kilowatts is required, the voltage being equally distributed upon the two capacitors 3 and 5. It will be realized from these examples that the power and voltage requirements in apparatus according to FIGS. 1, 2 or 4 with a voltage doubler connection, are extremely favorable and permit the use of conventional alternators as available in commerce, together with other components of conventional type and relatively small space requirements. This is due to the fact that the alternator or other current source need be rated only as required by the amount of power to be disseminated for electrotaxis but need not be rated for any shock loads since loads of the latter type do not occur by virtue of the present invention. The time spacing of the electrotaxis pulses, being equal to, or in integral multiple of, the alternator cycle frequency is also favorable in practice.

An embodiment of the type exemplified by FIG. 5 is less preferred for reasons that will appear presently. When using a full-wave rectifier, the desired symmetrical loading of the current source requires making the pulse frequency twice that of the alternator cycle frequency, so that the discharge capacitor is charged during each half-wave and is discharged at the moment or near each zero passage of the alternator voltage. When using an alternator of 50 c.p.s. frequency, the frequency of pulse recurrence will be 100 c.p.s. which is less favorable. Furthermore, a total of four rectifiers are needed instead of only two used in the voltage doubler circuit. It will further be understood that either the alternator voltage or the secondary transformer voltage must be twice as high as in the voltage doubler system. In all other respects, however, an apparatus according to FIG. 5 also permits realizing the novel advantages of the present invention.

I claim:

1. Apparatus for sea fishing by electrotaxis, comprising mutually spaced electrodes submerged in sea water when in operation, electric capacitor means, periodic switch means connecting said capacitor means intermittently across said electrodes for passing discharge pulses through the water, a single-phase alternating-current source, circuit means comprising a full-wave rectifier and connecting said source with said capacitor means for charging the latter during both half-wave periods of the source voltage, and control means in controlling connection with said switch means and responsive to given zero-passage conditions of said source voltage for releasing said pulses at respective moments near zero passages of said voltage.

2. Apparatus for sea fishing by electrotaxis, comprising electrodes submerged in sea water and spaced from each other when in operation, a source of single-phase alternating current of low frequency, storage capacitor means, full-wave rectifier means connecting said capacitor means with said source for charging said capacitor means by rectified current during both half-wave periods of said source, circuit means comprising normally open switch means and connecting said capacitor means with said electrodes for discharging said capacitor means through the sea water and forming together with said electrodes and the sea water an aperiodically damped loop circuit of high natural frequency compared with the frequency of said source whereby each closing of said switch means releases a capacitor discharge pulse of slight duration compared with the half-wave period of said alternating current, said switch means having a control circuit connected with said source for closing said switch means during given zero passage conditions of the source voltage, whereby said discharge pulses are released at periodically recurrent moments near respective zero passages of said source voltage.

3. Electric apparatus for sea fishing by means of direct-current pulses passing between electrodes through the sea water, comprising an electrode circuit, a single-phase alternator, a voltage-doubling network of capacitors and rectifiers connected to said alternator for voltage-cumulatively charging said capacitors during the two half-wave periods respectively of the alternator voltage, periodic switch means connecting said electrode circuit across said capacitors for periodically passing capacitor discharge pulses through said circuit, and control means in controlling connection with said switch means and responsive to given zero passage conditions of said alternator voltage for releasing said respective pulses at recurrent moments near full-wave zero passages of said alternator voltage, whereby the alternator load is substantially uniform in both half-wave periods.

4. Electric apparatus for sea fishing by means of direct-current pulses passing between electrodes through the sea water, comprising an electrode circuit, a source of single-phase alternating current, a network of capacitors and rectifiers connected with said source for charging said capacitors by rectified current during both half-waves of the source voltage, said electrode circuit being connected across said capacitors and comprising normally open electronic switch means for passing a discharge pulse from said capacitors through the sea water when said switch means close, said switch means having zero-voltage responsive control means connected with said source for momentarily closing said electronic switch means only when said source voltage passes through given zero-passage conditions, said control means including a phase shifter connected to said source.

5. Electric apparatus for sea fishing by means of direct-current pulses passing between electrodes through the sea water, comprising an electrode circuit, a single-phase alternator, a transformer having a primary winding connected to said alternator, a voltage-doubling network having two serially interconnected capacitors and having two rectifiers connecting said capacitors with said transformer for cumulatively charging said capacitors during respective two half-wave periods of the transformer voltage, said electrode circuit being connected across said series-connected capacitors to receive discharge pulses therefrom, normally open electronic switching means connected in said circuit between said capacitors and said electrodes for controlling said pulses, said electronic switching means having control means connected to said transformer and responsive to given zero-passage conditions of the alternator voltage for momentarily closing said electronic switching means each time the alternator voltage passes through said zero-passage conditions.

6. Electric apparatus for sea fishing by means of direct-current pulses passing between electrodes through the sea water, comprising an electrode circuit, a single-phase alternator, a transformer having a primary winding connected to said alternator, a voltage-doubling network having two serially interconnected capacitors and having two rectifiers connecting said capacitors with said transformer for cumulatively charging said capacitors during the two half-wave voltage periods respectively, said electrode circuit being connected across said series-connected capacitors to receive discharge pulses therefrom, a normally non-conductive ignitron series-connected in said electrode circuit for controlling said pulses, said ignitron having ignition control means comprising a phase shifter connected to said transformer for igniting said ignitron at a given moment near the zero passage of the alternator voltage.

7. Electric apparatus for sea fishing by means of direct-current pulses passing between electrodes through the sea water, comprising an electrode circuit, a single-phase alternator, a transformer having a primary winding connected to said alternator, a voltage-doubling network having two serially interconnected capacitors and having two rectifiers connecting said capacitors with said transformer for cumulatively charging said capacitors during the two half-wave voltage periods respectively, said electrode circuit being connected across said series-connected capacitors to receive discharge pulses therefrom, a normally non-conductive ignitron series-connected in said electrode circuit for controlling said pulses, said ignitron having ignition control means comprising a phase shifter connected to said transformer for igniting said ignitron at a given moment near the zero passage of the alternator voltage, said ignition control means comprising an adjustable resistor forming part of said phase shifter for setting said given ignition moment relative to the cycle period of the alternator voltage, a magnetically saturable ignition transformer having a primary winding and a secondary winding of which said primary winding is connected to said phase shifter, a solid-state diode, said ignitron having a control electrode connected through said diode with said secondary winding.

References Cited in the file of this patent

UNITED STATES PATENTS

| | | |
|---|---|---|
| 2,233,045 | Bonner et al. | Feb. 25, 1941 |
| 2,426,037 | Mahoney et al. | Aug. 19, 1947 |
| 2,745,205 | Kafka | May 15, 1956 |
| 2,866,106 | Schuh | Dec. 23, 1958 |

FOREIGN PATENTS

| | | |
|---|---|---|
| 836,416 | Germany | Apr. 10, 1952 |